L. A. YOUNG.
UPHOLSTERY SPRING CONSTRUCTION.
APPLICATION FILED MAR. 3, 1919.
1,302,119.
Patented Apr. 29, 1919.
3 SHEETS—SHEET 1.
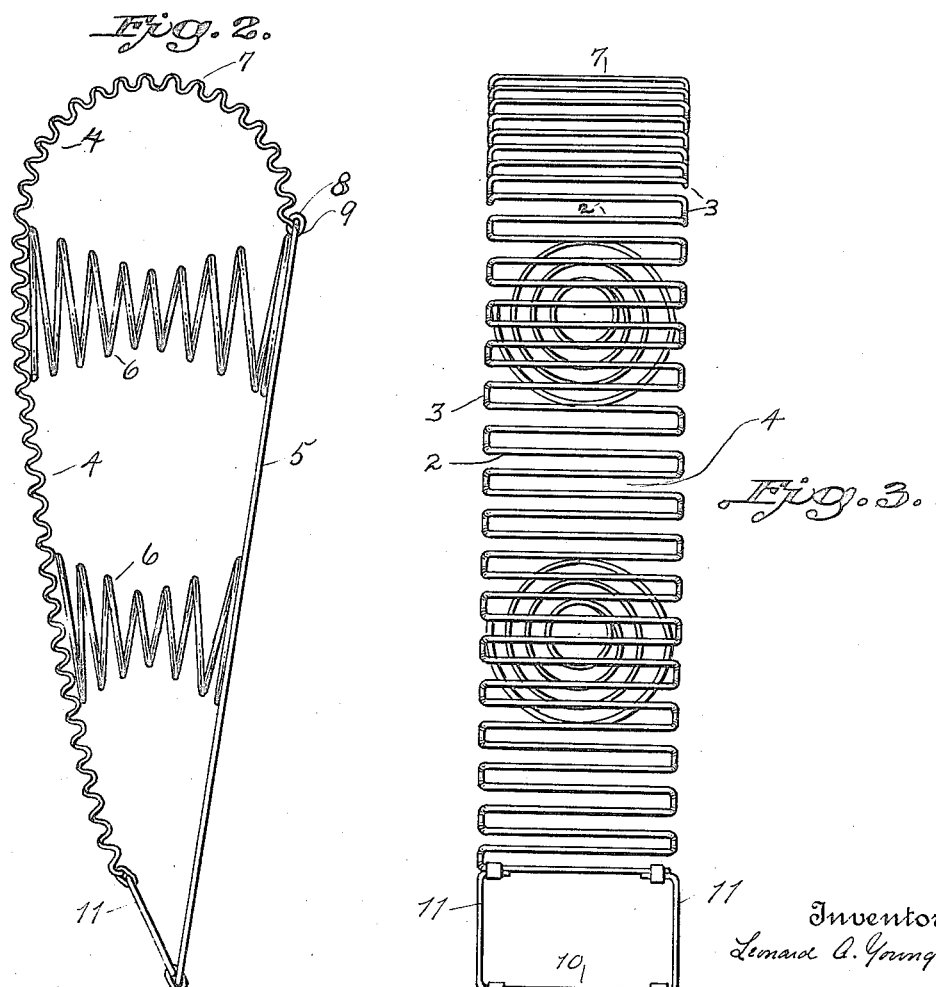
Inventor
Leonard A. Young
By
Clement R. Stickney
Attorney L. A. YOUNG.
UPHOLSTERY SPRING CONSTRUCTION.
APPLICATION FILED MAR. 3, 1919.
1,302,119.
Patented Apr. 29, 1919.
3 SHEETS—SHEET 2.
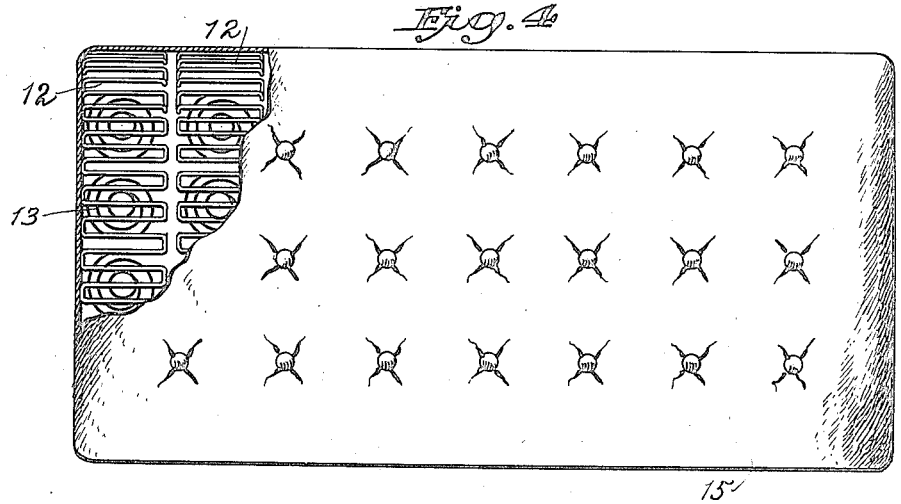
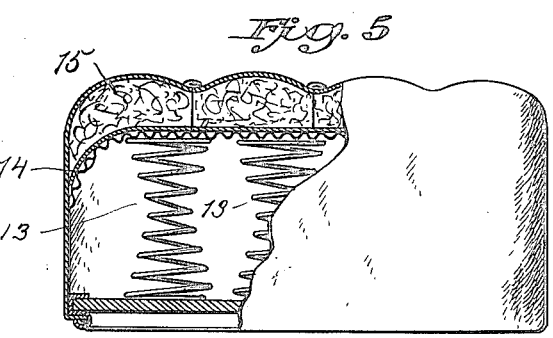
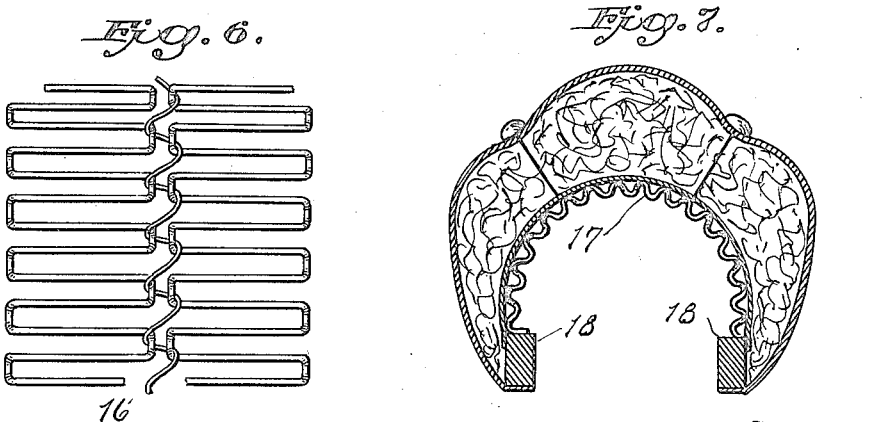

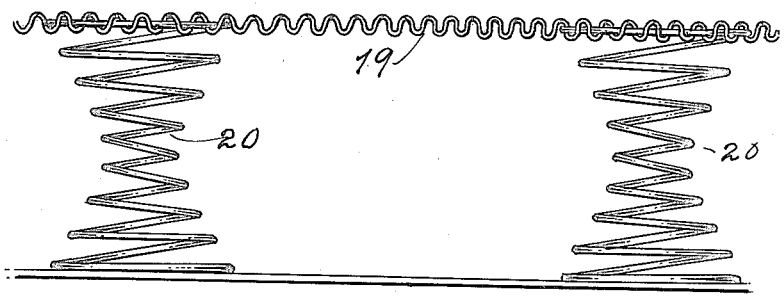
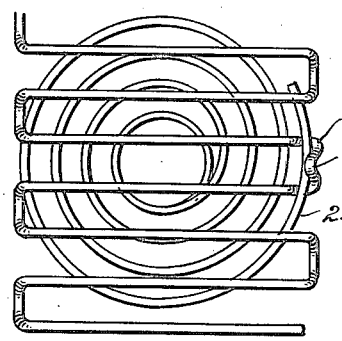
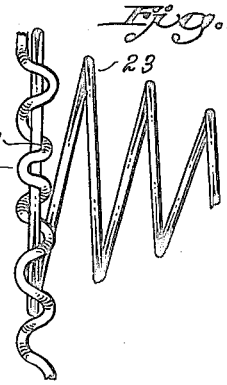
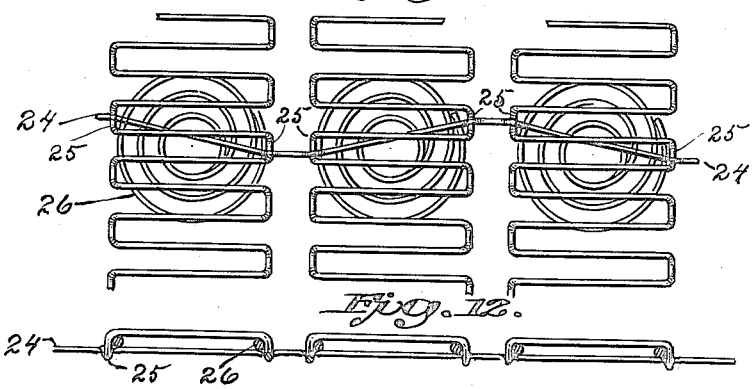

UNITED STATES PATENT OFFICE.

LEONARD A. YOUNG, OF HIGHLAND PARK, MICHIGAN.

UPHOLSTERY SPRING CONSTRUCTION.

1,302,119. Specification of Letters Patent. Patented Apr. 29, 1919.

Application filed March 3, 1919. Serial No. 280,248.

*To all whom it may concern:*

Be it known that I, LEONARD A. YOUNG, a citizen of the United States, residing at Highland Park, Wayne county, State of Michigan, have invented certain new and useful Improvements in Upholstery Spring Constructions, of which the following is a full, clear, and exact specification.

This invention relates to a spring for use as a member of various upholstery spring constructions and to various arrangements and dispositions thereof whereby a yielding support is obtained for upholstery and the like over considerable spaces and different curves, the spring being particularly adaptable in providing the support for the upper marginal portions of back springs, the roll edges of seat cushions and roll used for arm rests and the like in carriage trimming.

The invention consists in the matters hereinafter set forth, and more particularly pointed out in the appended claims.

In the drawings:

Figure 1 is a view of a spring member which is an embodiment of the invention;

Fig. 2 is a view in side elevation of a back spring construction the spring as an element thereof;

Fig. 3 is a view in front elevation of the back spring construction;

Fig. 4 is a plan view of a rolled edge cushion, partially broken away, depicting the use of the spring for a curved or drop edge;

Fig. 5 is a view in side elevation of the rolled edge cushion;

Fig. 6 is a view in detail of one means for securing adjacent portions of the spring together;

Fig. 7 is a view in detail showing the adaptation of the spring for edge rolls for carriage trimming;

Fig. 8 is a view in detail illustrating a flat arch where a light load is to be carried over a considerable space;

Figs. 9 and 10 are views in detail of one means of securing the spring to a spiral supporting spring; and Figs. 11 and 12 are views in detail of another means of anchoring the springs in position on a plurality of spiral springs.

As herein indicated a wire 1 of suitable gage and quality, is folded transversely in a right plane to form a series of oppositely disposed loops, corrugations or bends 2, the arms of which are substantially parallel and are of sufficient length to give desired width to the completed spring. At the extremities of the loops, the bights 3 are bent downwardly into planes that are transverse to the main plane of the loops. Or the bight on one side may be bent down and those on the other side may be turned upwardly. The depth of these down-bent bights is increased or decreased in proportion to the flexibility or stiffness desired. When so formed, the completed spring as a whole has considerable load carrying capacity, each main loop being supported by the companion bights of the reversely disposed adjacent loops.

One of the uses of which such spring lends itself is in the back spring construction indicated in Figs. 2 and 3 in which the upright arches 4 are formed each of this flat spring 1, and are carried in spaced relation to the supporting back 5 by the usual body spring 6 of hour-glass conical or other preferred type.

The crown 7 of each arch is formed by bending the spring over and anchoring at the extremity as at 8, or in any preferred manner, to the upper member 9 of the back frame. The corrugated spring may be carried to the lower member 10 of the back frame or, as herein indicated, may be coupled or stayed thereto by connecting wires 11 of any preferred type.

In Figs. 4 and 5, springs 12 of this corrugated pattern are supported on body springs 13 of the type usually used in cushions, and extend forwardly and downwardly as indicated at 14, to provide any desired curved or rolled edge, the support afforded to the upholstery 15 being such that the necessity of rolls of hair or light stuffing is obviated.

If the corrugated springs are sufficiently close to each other, as indicated in the detail Fig. 6, they may be conveniently joined by running a spiral strand 16 of the usual woven wire mesh into interlocking relation with the adjacent bights of two strips. In Fig. 7, a strip 17 is bent into an arch with the two end portions anchored or supported by rigid members 18 or parts of a support, with upholstery applied thereon, thus providing a light yielding roll for carriage trimming.

Where a light load has to be carried over a comparatively flat surface, the corrugated spring may be readily employed as in Fig. 8, where it is shown at 19 supported on widely separated body springs 20. Or the supports may be rigid.

In Figs. 9 and 10, one method of locking the strip to the end turn of a spiral body spring is indicated. That is, a bight 21 is upbent with the middle portion 22 thereof closing around the wire 23 of the spring. In such instance, the band is given a transverse dimension substantially equal to the general diameter of the upper coil of the spring, so that it receives the latter coil between the downturned bights and thus the spring is held against shifting in any direction.

In Figs. 11 and 12, a locking wire 24 is threaded through the bights 25 and under the turns 26 of the supporting springs, thus securing them together. If desired, the locking wire 24 may be crimped at the points of interception to avoid any longitudinal movement of the locking wire itself.

As the one result of this construction, a spring band is obtained which may be bent as desired for arches of any degree of curvature and which when so disposed, affords a very resilient yielding surface to applied upholstery. The arms of the loops connecting the successive bights do not themselves bend but spring only as if hinged on the supporting bights, and thus there is no local depression of any loop between the ends thereof, each loop giving as a whole, so that the depressions only occur between alternate loops. This is an important result of the construction as it avoids any sagging in spots of the covering, because of the slight intervals between adjacent loops, while at the same time there are no hard or unyielding areas.

Because of the ease with which the strip may be bent longitudinally, arches of different heights and spans may be made by it, and used for back springs. The arches so constructed, while yielding locally to loads, return to their original conformation when relieved of any weight so that there is no breaking down of the back, and it cannot become lumpy, a condition that frequently occurs when the filling alone is relied upon, as the latter becomes packed from use.

Obviously changes in the details of construction and dispositions of the device may be made without departing from the spirit of the invention, and I do not care to limit myself to any particular form arrangement or use thereof.

I claim—

1. In upholstery spring construction, an arch member formed of a deeply corrugated spring strip or wire with the end bights of correspondingly disposed corrugations lying in a plane transverse to the main plane of the corrugations.

2. In upholstery spring construction a spring band comprising a wire or strip of spring material bent between the ends thereof into oppositely extending loops lying in the same plane, with the end bights of the loops bent into planes transverse to the main plane of the loops.

3. In upholstery spring construction a spring band comprising a wire or strip of spring material bent between the ends thereof into sets of oppositely extending loops that are alternately disposed in the same plane with the end bights of corresponding loops of a set bent in a plane transverse to the main plane of the loops.

4. In upholstery spring construction a spring member formed of a wire or narrow spring strip bent into oppositely extending loops, the limbs of which are substantially parallel and the end bights of which are bent transversely to the main plane of the loops.

5. In upholstery spring construction a wire or narrow spring strip folded into deep corrugations disposed in a right plane with the end portions of the corrugations bent into planes transverse to this right plane.

6. In upholstery spring construction arches formed each of a wire or narrow spring strip bent between the ends thereof into oppositely extending loops with the end portions of the loops bent transversely to the main plane of the loops and body springs yieldingly supporting the arches, an end bight of an arch being interlocked with the contiguous turn of a body spring.

7. In upholstery spring construction, a spring band formed of a narrow spring strip or wire that is deeply corrugated with the end bights of correspondingly disposed corrugations lying in a plane transverse to the main plane of the corrugations and a spiral supporting spring contacting with the band between the bights, one of the latter interlocking with the contacting turn of the body spring.

8. In upholstery spring construction, an arch formed of a deeply corrugated spring strip or wire with the end bights of correspondingly disposed corrugations lying in a plane transverse to the main plane of the corrugation and spiral springs yieldingly supporting the arch member, the contacting turns of the springs lying between the end bights with which they are interlocked.

9. In upholstery spring construction, a back frame, arches each formed of a deeply corrugated spring strip or wire with the end bights of correspondingly disposed corrugations lying in the plane transverse to the main plane of the corrugations, the arches being secured at the upper ends to an upper part of the frame to extend above and forwardly therefrom, and body springs on the back frame yieldingly supporting the arches between the ends of the latter.

10. In upholstery spring construction, a back frame, arches each formed of a deeply corrugated spring strip or wire with the end bights of correspondingly disposed corrugations lying in the plane transverse to the main plane of the corrugations, the arches being secured at the upper ends to an upper part of the frame to extend above and forwardly therefrom, and upholstery mounted on the structure.

11. In upholstery spring construction, a main frame, body springs mounted thereon and arches spanning across the body springs, curved to form a rolled edge beyond the body springs, each arch being formed of a narrow strip or wire bent between the ends thereof into oppositely extending loops lying in the same plane with the end bights of the loops bent into planes transverse to the main plane of the loops.

12. In an upholstery spring construction spring bands each comprising a wire or inner spring strip bent into oppositely extending loops lying in the same plane with the end bights of the loop lying in planes transverse to the main plane of the loops and spiral strands of resilient material interlocking with adjacent bights of proximate strips.

LEONARD A. YOUNG.